United States Patent Office 2,818,097
Patented Dec. 31, 1957

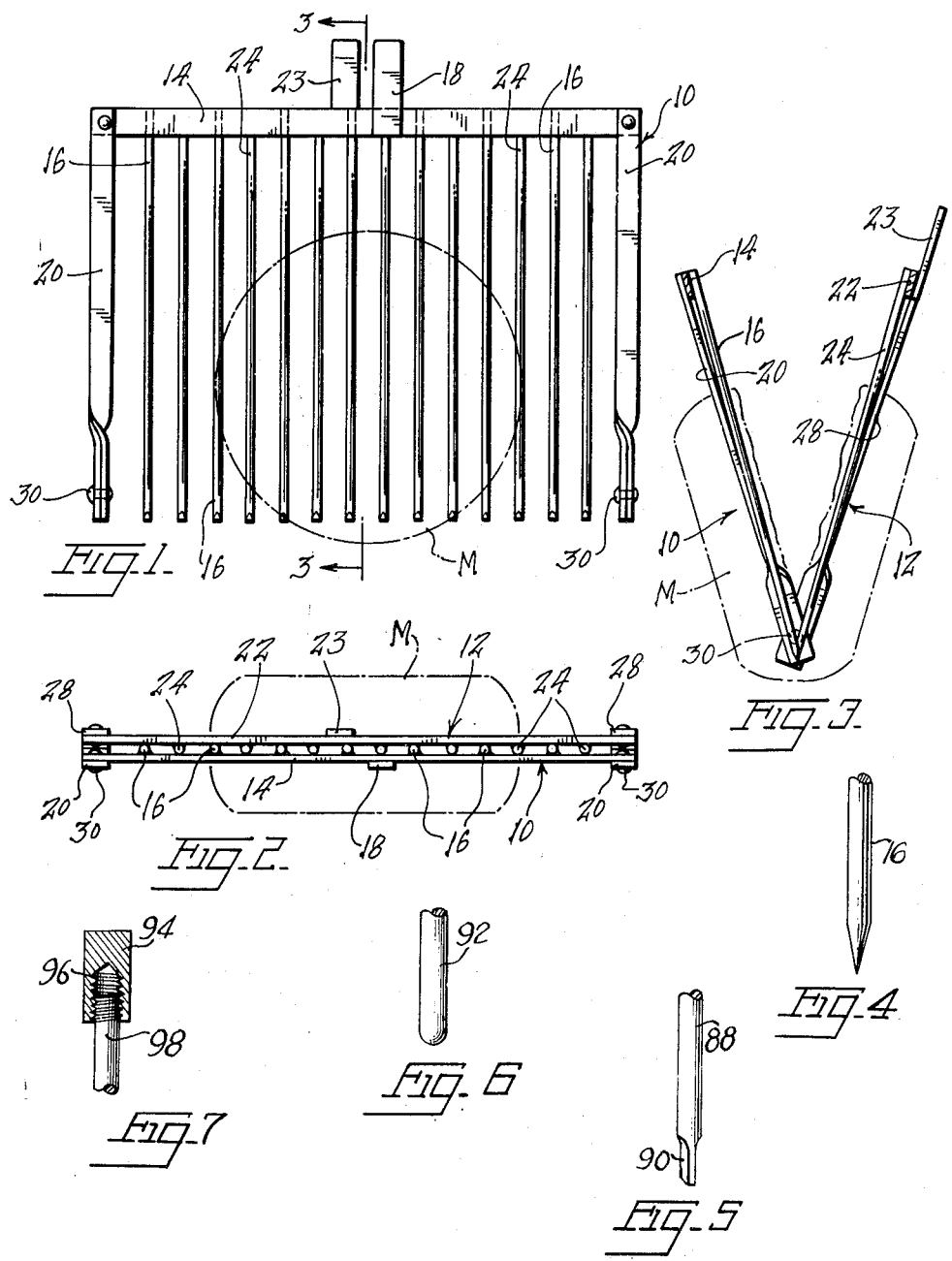

2,818,097
MUFFIN OR CAKE DIVIDER

Samuel R. Glanz, West Hempstead, N. Y.

Application November 18, 1954, Serial No. 469,774

3 Claims. (Cl. 146—203)

This invention relates to a manually operable device for dividing a muffin, biscuit, or other baked item.

Articles of the type stated are desirably of fluffy, light interior texture, and so as not to destroy the inner texture thereof, are best torn or pulled apart, rather than sliced with a knife. When sliced, the interior of the food item tends to compact at the location of the cut made therein, detracting from its appearance and absorbency. The divided faces of the muffin should be rough, rather than smooth.

However, when an attempt is made to tear apart a muffin with one's hands, the muffin is, often, not divided in equal halves, and the main object of the present invention is to provide a muffin separator or cutter which will not only divide the muffin at the exact location desired, but also will leave the opposite faces thereof rough, while not compacting the interior of the muffin in any way.

In accordance with the invention, a muffin separator is formed with separable frames, each provided with a series of small diameter tines, the frames being normally disposed with the tines of one frame disposed substantially in the plane of the tines of the other frame, to facilitate entry of the tines of both frames into the muffin along the lines at which the muffin is to be divided. The frames are then capable of being pulled apart, causing the respective series of tines to be spread apart, in such a manner as to pull the muffin apart at the selected location, without compacting the same.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a muffin separator according to the present invention, as it appears when operatively positioned relative to the muffin or biscuit to be divided.

Fig. 2 is a top plan view.

Fig. 3 is a transverse sectional view on line 3—3 of Fig. 1 in which the frames have been pulled apart to divide the muffin.

Fig. 4 is an enlarged, fragmentary perspective view showing the point of one of the tines.

Figs. 5 and 6 are views similar to Fig. 4 showing modified tine formations.

Fig. 7 is an enlarged, transverse sectional view through a modified form of tine support bar.

In the form of the invention shown in Figs. 1–3, the muffin divider comprises a pair of complemental frames generally designated 10, 12. Frame 10 is of inverted U-shape, and includes an elongated, horizontally disposed, straight tine support bar 14. A series of elongated, straight tines 16 are spaced longitudinally of and depend from the bar 14, the tines 16 being welded or otherwise fixedly secured to the inner surface of the bar 14.

Medially between its opposite ends, the bar 14 is provided with a handle 18, extending upwardly from bar 14 and welded or otherwise fixedly secured thereto.

At its opposite ends, bar 14 is provided with depending bars or arms 20, riveted or otherwise fixedly secured to the bar 14.

The frame 12 includes a tine support bar 22 extending in closely spaced, parallel relation to bar 14 when the frames are in their closed positions shown in Figs. 1 and 2. A handle 23 is provided for the bar midway its ends. Bar 22 is coextensive in length with the bar 14, and welded or otherwise fixedly secured to the bar 22 and depending therefrom are tines 24. These are disposed in staggered relation relative to the tines 16, each tine 24 occurring in a location medially between the tines 16 at opposite sides thereof.

Bars or arms 28, riveted at their upper ends to the ends of bar 22, are pivotally connected at their lower ends to the lower ends of the arms 20. Arms 20, 28, adjacent their lower ends, are axially twisted through 90°, as shown in Fig. 1, to facilitate their pivotal connection to each other.

Normally, the frames are in the closed position shown in Figs. 1 and 2 and in this position, the series of tines 16 is coplanar with the series of tines 24 (see Fig. 2). When the frames are so positioned, the tines can be inserted in a muffin M, biscuit or like article at the location at which the muffin is to be divided. When the tines have been fully inserted, the handles of the respective frames are pulled apart, so that the frames pivot about the axis of the connections 30 to the positions shown in Fig. 3. The tines thus move into downwardly convergent planes, and this is operative to divide the muffin. The muffin, as will be seen from Fig. 3, will be torn apart, rather than sliced, thus leaving the inner texture thereof uncompacted and forming rough faces on the divided halves. The muffin is thus not damaged so far as its interior texture is concerned, in any way.

After the muffin has been fully divided, the frames are returned to closed position and withdrawn from the muffin.

In Fig. 4 it is shown that one form of tine may have a pointed, conical free end. In Fig. 5, a modified form of tine 88 is shown, having a flattened, blunt free end 90. In the form shown in Fig. 6, the tine 92 is not sharpened or flattened at its free end, and this form can be used when the tine is of small diameter, as would usually be the case.

In Fig. 7 there is shown a modified form of connection of the tines to the associated tine support bar. In this form the tine support bar has been designated at 94 and is shown in transverse section. Bar 94, throughout its length, will be provided with equidistantly spaced, downwardly opening, threaded sockets 96 and the tines 98 will be correspondingly threaded for engagement in the sockets. This will facilitate replacement of tines should they become bent or should a different spacing arrangement of the tines be desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A divider for muffins, biscuits, and the like comprising a pair of complemental frames each including a tine support bar and a series of tines depending from the bar, said frames being pivotably connected for shifting between a first position in which the series of tines of each frame is substantially coplanar with the series of the other frame for insertion of the coplanar series in a muffin to be divided, and a second position in which said series are spread apart out of coplanar relation to divide the muffin, said frames being of inverted U-shaped formation with the cross bars thereof constituting the tine supporting bars, each frame including depending bars secured to opposite ends of the tine support bar and handles extending upwardly from the midlength portions of the cross bars, said pivotal connection of the respective frames being positioned at the free ends of the end bars remote from the tine bars, said pivotally connected ends of the end bars being axially twisted through ninety degrees relative to the ends of the end bars connected to the tine support bars and being in overlapped relation.

2. A divider for muffins, biscuits and the like including a pair of pivoted frames, said frames each including a top bar and end bars depending therefrom, spaced tines depending from the top bar between said end bars, means of pivotal connection between the free ends of said end bars, said tines being arranged side by side and coplanar when the divider is in closed position, and upwardly extending handles on the top bars of the frames for swinging said frames and tines apart.

3. A divider for muffins, biscuits and the like including a pair of pivoted frames, said frames each including a top bar and end bars depending therefrom, and spaced tines depending from the top bar between the end bars, the free ends of said end bars being twisted and in overlapping relation, with aligned openings, and pivot pins in said openings, said tines being arranged side by side and coplanar when the divider is in closed position, and upwardly extending handles on the top bars of the frames for swinging said frames and tines apart, said handles being in offset vertical planes when the divider is in closed position.

References Cited in the file of this patent

UNITED STATES PATENTS

| | | |
|---|---|---|
| 1,767,898 | Sargent | June 24, 1930 |
| 2,472,354 | Waters | June 7, 1949 |
| 2,588,579 | Schneider | Mar. 11, 1952 |

FOREIGN PATENTS

| | | |
|---|---|---|
| 94,408 | Sweden | Jan. 26, 1939 |
| 145,284 | Sweden | Mar. 4, 1954 |